US011124066B2

(12) United States Patent
Weflen

(10) Patent No.: US 11,124,066 B2
(45) Date of Patent: Sep. 21, 2021

(54) AUXILIARY POWER UNIT FOR MOBILE SERVICE VEHICLE

(71) Applicant: Airtek Systems Inc., Edmonton (CA)

(72) Inventor: Darryl Weflen, Edmonton (CA)

(73) Assignee: Airtek Systems Inc., Edmonton (CA)

(*) Notice: Subject to any disclaimer, the term of this patent is extended or adjusted under 35 U.S.C. 154(b) by 317 days.

(21) Appl. No.: 16/531,614

(22) Filed: Aug. 5, 2019

(65) Prior Publication Data

US 2020/0039349 A1 Feb. 6, 2020

Related U.S. Application Data

(60) Provisional application No. 62/714,631, filed on Aug. 3, 2018.

(51) Int. Cl.
| | | |
|---|---|---|
| *B60K 25/06* | (2006.01) | |
| *H02J 7/14* | (2006.01) | |
| *F15B 11/042* | (2006.01) | |
| *F15B 21/00* | (2006.01) | |

(52) U.S. Cl.
CPC .......... *B60K 25/06* (2013.01); *F15B 11/0423* (2013.01); *F15B 21/001* (2013.01); *H02J 7/1423* (2013.01)

(58) Field of Classification Search
CPC .............................. B60K 25/06; F15B 21/001
See application file for complete search history.

(56) References Cited

U.S. PATENT DOCUMENTS

| | | | |
|---|---|---|---|
| 2009/0162218 A1 | 6/2009 | Weflen | |
| 2010/0219007 A1 | 9/2010 | Dalum et al. | |
| 2014/0137548 A1* | 5/2014 | Imura | E02F 9/2095 |
| | | | 60/420 |
| 2017/0070065 A1 | 3/2017 | Weflen | |

OTHER PUBLICATIONS

Examiner's Report issued for CA Patent Appl. No. 3,051,000, dated Dec. 17, 2020, 5 pp.

* cited by examiner

*Primary Examiner* — F Daniel Lopez
(74) *Attorney, Agent, or Firm* — James A. Sheridan; Sheridan Law, LLC

(57) ABSTRACT

An auxiliary power unit system for mobile service vehicles is provided that can provide DC power to DC-powered equipment. The system attaches to the power take-off port of the transmission and can provide power to the DC-powered equipment without idling the engine of the mobile service vehicle, thereby reducing fossil fuel consumption and engine exhaust emissions.

20 Claims, 2 Drawing Sheets

AUXILIARY POWER UNIT FOR MOBILE SERVICE VEHICLE

CROSS-REFERENCE TO RELATED APPLICATIONS

This application claims priority of U.S. provisional patent application Ser. No. 62/714,631 filed Aug. 3, 2018, which is incorporated by reference into this application in its entirety.

TECHNICAL FIELD

The present disclosure is related to the field of auxiliary power units, in particular, power unit systems for providing direct current ("DC") power for DC electric-powered equipment used on mobile service vehicles.

BACKGROUND

Mobile service vehicles are vehicles typically powered by gasoline or diesel internal combustion engines and are used by service personnel to service heavy duty equipment, machinery and other vehicles. There is a growing need for mobile service vehicles to employ electric-powered equipment such as the E60™ DC-powered air compressor and E-Vortex™ DC-powered hydraulic pump unit as manufactured by Airworks Compressors Corp. of Edmonton, Canada. While some motor vehicles have charger/alternator systems that could power these types of equipment, it requires the mobile service to have its engine running to do so. In some regions, it may be undesirable or even illegal to have the engine idling or running while the mobile service vehicle is stationary due to the production of exhaust fumes from the engine. In addition, there is need for military trucks and long-haul truck to have the capability of acting as an auxiliary power unit ("APU") that can provide a higher output charging system capable of higher voltages than standard charging/alternator systems on motor vehicles are capable of providing.

It is, therefore, desirable to provide an auxiliary power unit for mobile service vehicles that can satisfy these needs.

SUMMARY

An auxiliary power unit ("APU") system for operating hydraulically-operated equipment where the APU is configured to be disposed in or on mobile service vehicles is provided. In some embodiments, the APU can be adapted to a wide variety of motor vehicles regardless of make, model or year. It some embodiments, the APU can be used on Class 4 and heavier trucks as fitting the charging system to the vehicle engine would prove costly and time-consuming due to the sheer variety of truck/engine configurations that exist. In some embodiments, the most universal drive system on such trucks would be the transmission power take-off ("PTO") as it would provide universal access to a drive mechanism for the charging system.

In some embodiments, the APU system can provide rapid battery charging using high amperage DC power, and can be easily adaptable to a wide variety of motor vehicles with a focus on class 4 and larger trucks to provide a non-idle solution to provide heating, ventilation and air conditioning ("HVAC") as well as alternating current ("AC") and DC power requirements without operating an internal combustion engine to supply these needs, which can reduce fuel consumption and engine exhaust emissions.

Broadly stated, in some embodiments, an auxiliary power unit system for operating hydraulically-operated equipment can be provided, the system configured to be disposed in or on a mobile service vehicle comprising an internal combustion engine operatively coupled to a transmission and at least one alternator operatively coupled to the engine, the transmission comprising a power take-off ("PTO") port, the system comprising: a first hydraulic pump operatively coupled to the PTO port; a hydraulic motor/pump operatively coupled to the first hydraulic pump via a control block/valve, the control block/valve configured to operatively couple to the hydraulically-operated equipment; a direct current ("DC") electric motor/generator operatively coupled to the hydraulic motor/pump via a first clutch; and at least one battery operatively coupled to the DC electric motor/generator via one or both of a charger control circuit and a motor control circuit, wherein the charger control circuit is operatively coupled to the at least one alternator.

Broadly stated, in some embodiments, a method can be provided for operating hydraulically-operated equipment with an auxiliary power unit system disposed in or on a mobile service vehicle comprising an internal combustion engine operatively coupled to a transmission and at least one alternator operatively coupled to the engine, the transmission comprising a power take-off ("PTO") port, the method comprising: receiving the system, wherein the system comprises: a first hydraulic pump operatively coupled to the PTO port, a hydraulic motor/pump operatively coupled to the first hydraulic pump via a control block/valve, the control block/valve configured to operatively couple to the hydraulically-operated equipment, a direct current ("DC") electric motor/generator operatively coupled to the hydraulic motor/pump via a clutch, and at least one battery operatively coupled to the DC electric motor/generator via one or both of a charger control circuit and a motor control circuit, wherein the charger control circuit is operatively coupled to the at least one alternator; operatively coupling the hydraulically-operated equipment to the control block/valve; and operating the DC electric motor/generator with the at least one battery to operate the hydraulic motor/pump as a pump for pumping hydraulic fluid to the hydraulically-operated equipment through the control block/valve.

Broadly stated, in some embodiments, the first clutch can comprise one of a one-way free-wheeling clutch, an electrically-operated clutch and a centrifugal clutch.

Broadly stated, in some embodiments, the system can comprise one or both of an air conditioning compressor and a second hydraulic pump operatively coupled to the DC electric motor/generator.

Broadly stated, in some embodiments, the method can comprise operating one or both of an air conditioning compressor and a second hydraulic pump with the DC electric motor/generator.

Broadly stated, in some embodiments, the charger control circuit can be configured to operatively couple with the at least one alternator.

Broadly stated, in some embodiments, the system can comprise an alternating current ("AC") inverter operatively coupled to the at least one battery.

Broadly stated, in some embodiments, the at least one battery can comprise two batteries.

Broadly stated, in some embodiments, the system can comprise a voltage boosting circuit operatively coupled to the two batteries, the voltage boosting circuit configured to couple the two batteries in a series configuration.

Broadly stated, in some embodiments, the method can comprise coupling the two batteries in a series configuration with the voltage boosting circuit.

Broadly stated, in some embodiments, the system can comprise one or both of an electronic throttle control and an electronic throttle position sensor operatively coupled to the motor control circuit.

Broadly stated, in some embodiments, the system can further comprise one or both of a brake system sensor and an accelerometer operatively coupled to the charger control circuit.

Broadly stated, in some embodiments, the system can further comprise one or both of a brake system sensor and an accelerometer operatively coupled to the charger control circuit.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A system and method of providing HVAC and AC and DC electric power is provided wherein the system is disposed on a mobile service vehicle 100 and can operate when vehicle 100 is stationary and without the need to operate the prime mover engine F26 disposed in vehicle 100 while stationary, as well as a method to assist acceleration of the vehicle from a stop and recover energy during braking/slowing maneuvers.

Figure 1:
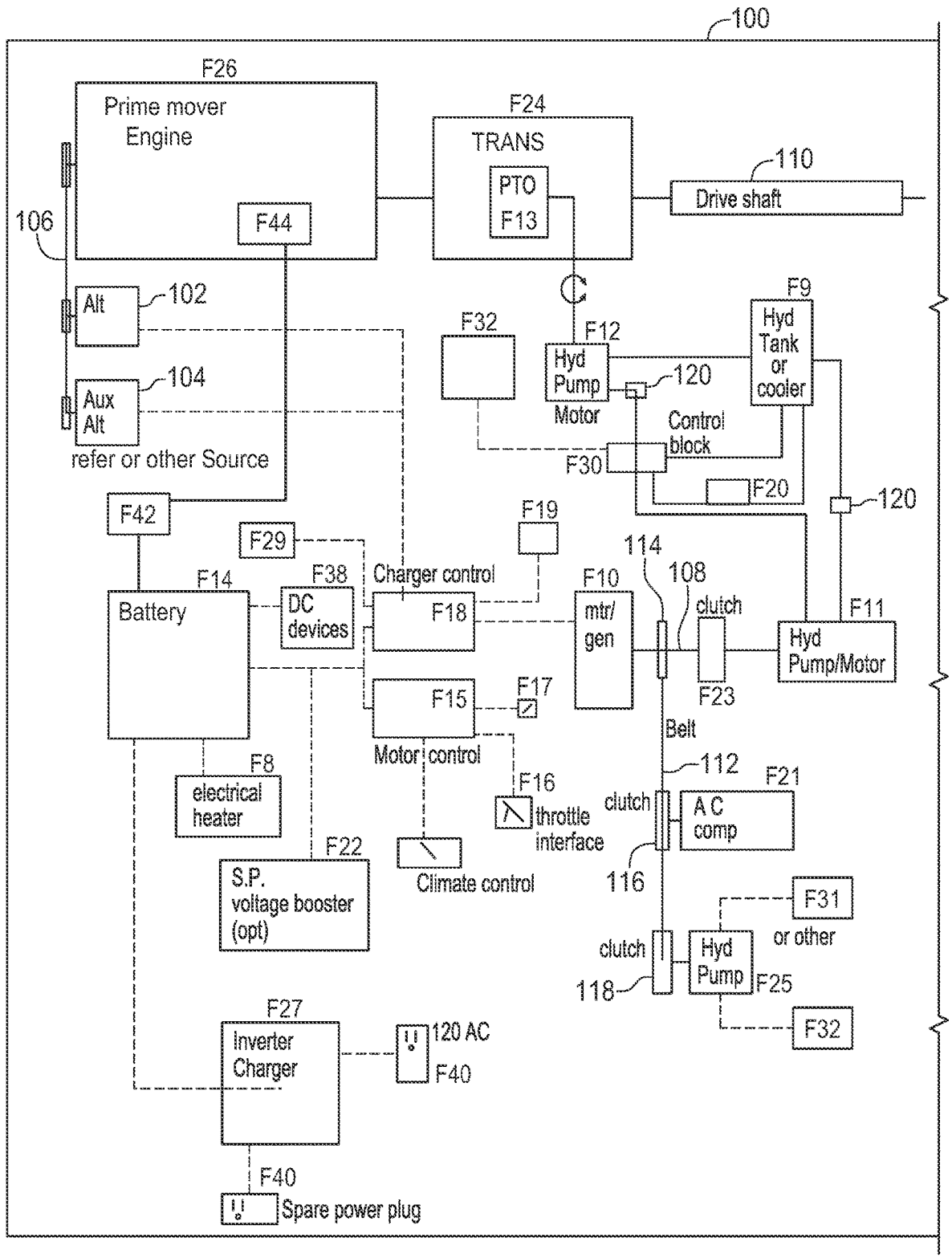
FIG. 1 is a block diagram depicting one embodiment of an auxiliary power unit system for mobile service vehicles.
Figure 2:
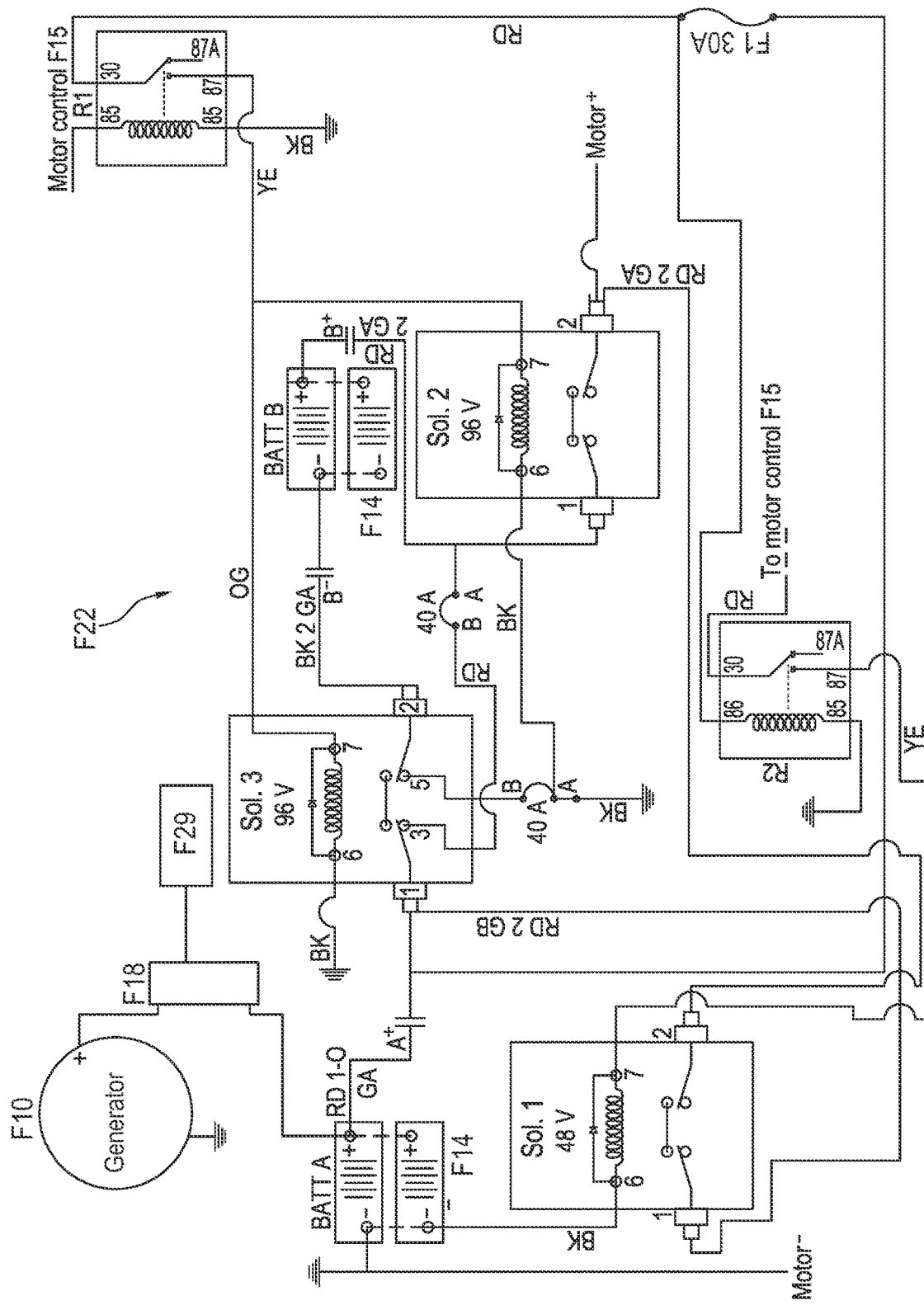
FIG. 2 is an electrical schematic view depicting a control circuit for use with the auxiliary power unit system of FIG. 1.

Referring to FIGS. 1 and 2, in some embodiments, the DC Charging generator could be directly coupled to the PTO drive F13 at the transmission F24 and through controlled rotational speed would provide the required voltage to supply the battery pack, condenser storage pack or electrical load/device. In some embodiments, vehicle 100 can comprise prime mover engine F26 operatively coupled to transmission F24 that is further operatively coupled to drive shaft 110 to provide rotational power to the driveline (not shown) of vehicle 100, as well known to those skilled in the art. Engine F26 can be operatively coupled to alternator 102 and auxiliary alternator 104 via drive belt 106, as well known to those skilled in the art.

In some embodiments, the PTO F13 can drive a hydraulic pump F12 to provide force to drive a hydraulic motor/pump F11 coupled to a DC Charging generator F10 via shaft 108, the combination of which mounted at a convenient location elsewhere in vehicle 100 allowing for easier installation and service access. Motor/pump F11 can operate either as a hydraulic motor or as a hydraulic pump depending on how it is be operated within system 100. Generator speed/output can be controlled through varying engine rpm and/or control of the hydraulic flow and pressure. In some embodiments, the system can comprise a hydraulic fluid tank or a hydraulic fluid cooler, or both, shown as F9 in FIG. 1, to store and/or cool the hydraulic fluid for the operation of the hydraulic components in the system.

In this configuration, the DC Generator F10 can also serve as a DC electric motor and, when coupled to the hydraulic drive motor/pump F11 through a decoupling device F23, such as an electrically-operated clutch, a centrifugal clutch, or a one-way freewheel clutch or directional mechanical sprag drive device disposed on shaft 108, DC generator F10 can also be used as a DC motor powered by the battery storage F14 to drive accessories such as hydraulic pump F25, air conditioning compressor F21, and other rotational devices, operatively coupled to DC generator F10 via drive belt 112 and pulleys 114, 116 and 118. This can be done directly rather than the common practice of using the battery pack(s) F14 to power an additional motor separate from generator F10.

In some embodiments, generator F10 can be used as a motor when coupled directly or through a clutch, a sprag clutch or similar coupling device F23 to drive hydraulic motor/pump F11 wherein hydraulic motor/pump F11 can then supply hydraulic power to the hydraulic pump F12, essentially causing the hydraulic pump F12 to become a hydraulic motor and when applying its rotational force to the PTO F13, it could be used as a source of propulsion to assist the vehicle primarily when starting out from a stopped position. The added power from the DC assist can reduce fuel consumption of the vehicle. This configuration would use the power stored in the storage device, battery or condenser F14.

In some embodiments, the battery system can be charged using regenerative braking as the vehicle is slowing, maximizing the battery charge without the use of fuel and extending brake system life. In some embodiments, the system can use a brake pressure transducer F19 to sense brake application along with an accelerometer sensor F17 to apply load to the generator in proportion to the braking load and use the charging load to slow the vehicle. The charging load can be battery pack F14 and/or a dump load F29 such as a heater element or other electrical load source once the battery pack F14 is sufficiently charged.

In some embodiments, the battery or power storage device (battery pack, condenser pack F14) can also be used to supply DC power to an AC inverter F27 comprising electrical one or more electrical outlets F40, or to supply DC power to other DC powered devices (radios, lights, etc.), shown as F38 in FIG. 1, while vehicle 100 is not running the combustion engine F26.

In some embodiments, stored power can also be utilized to assist or in some cases solely propel the vehicle 100 at low speeds whether the DC motor/generator F10 is directly coupled to the PTO F13 or through the remotely mounted DC Motor generator and coupled hydraulic motor/pump F11 supplying motive power back in to the vehicle transmission F24 and drive line to assist vehicle acceleration and reduce fuel requirements by the prime mover engine F26 during these maneuverers. DC power to DC motor F10 can be controlled by use of a motor control F15 and electronic throttle position sensor F16, or through inertia sensor(s) F17 detecting vehicle movement coupled with the electronic throttle position sensor F16 increasing the power to the DC motor F10 as throttle input increases and supplying dc motor power on an predetermined power curve the same predetermined curve can also use sensors 120 on the hydraulic pressure to determine and limit maximum power to be applied through the PTO as well as sense when the prime mover engine F26 has reached or exceeded the upper power limit of the DC power system and then switch the DC assist system off and let the prime mover engine F26 propel vehicle 100 and PTO F13 can then be disengaged from transmission F24 or left connected if in a traffic situation requiring stop and starting frequently.

In some embodiments, if the PTO F13 is left engaged, the regenerative braking feature can be used. In some embodiments, the system can allow for coasting with no additional load by diverting hydraulic fluid flow to tank F9 through control block/valve F30 and then load to recharge the batteries F14 through a charger control circuit F18 utilizing a sensor F19 in the brake system to trigger upon application of the brakes and/or exhaust brake application on vehicle 100 with the addition of an accelerometer F17 determine the amount of regenerative load to be applied when paired with the braking pressure sensor F19. This system can comprise of DC motor generator F10 and a charge control device, as is known to those skilled in the art, to regulate power delivered to the battery pack F14. When the battery charge has reached maximum charge level and when auxiliary braking is desired, braking assist can be performed by switching the generator output to a load such as a resistance load F29 in the generator circuit to convert/divert generator output causing generator load to assist in braking without battery charging through the creation of heat. In some embodiments, the supplied hydraulic force from the PTO/pump unit F13 can be diverted through an orifice F20, fixed or variable (such as a proportional hydraulic flow control), to add load during braking, such orifice F20 would not be restricting or used when vehicle not under braking.

When using the system to supply vehicle comfort or power systems while stationary, the system can also be used to charge the battery pack F14 by idling the engine F26, if desired, and an automatic engine start-stop system F42, which can be disposed or incorporated in motor control F15 or in a separate sub-component, that can comprise a voltage limit switch which can operate when the voltage of battery F14 drops to a pre-determined voltage limit wherein a signal can be provided to an auto start system F44, as well known to those skilled in the art, to start prime mover engine F26 to start thereby charging battery F14, and when battery F14 have been charged to another pre-determined voltage level, prime mover engine F26 can shut down upon receiving a further signal from engine start-stop system F42 so as to optimize fuel savings and comfort.

In some embodiments, the system can provide cab comfort for the mobile service vehicle. In some embodiments, air conditioning can be supplied as described above using DC motor F10 driving air conditioning compressor to supply standard air conditioning system F21, as well known to those skilled in the art. Heating can be supplied using an electrical heater F8 powered by the battery system. Alternatively, heat can be supplied by using the DC motor F10 to turn the hydraulic pump F25 and create hydraulic flow through a load device or orifice F31 creating heat and then transferring that heat through a heat exchanger or other means warming the cab of vehicle 100.

In some embodiments, voltage from 2 or more batteries F14 (shown as BATT A and BATT B in FIG. 2) can be controlled through a control circuit F22 to increase battery output voltage to a greater combined voltage, essentially doubling the voltage of the multiple batteries and increasing the power available to the DC Motor/Generator F10. In some embodiments, this can enable greater power output from the DC motor F10 to drive large pumps, compressors or other devices as well as increase power output to the DC motor F10 when assisting the vehicle in acceleration. In some embodiments, the control circuit F22 can comprise of a solenoid control circuit, as configured as shown in F22, essentially doubling battery voltage when required, either through manual selection by the operator or through a circuit controlled automatically by a load sensor or electronic throttle input and activating relay R2 for a base voltage (such as 12 volts from a nominal 12 volt battery) or relay R1 for a higher voltage or doubled voltage of 24 volts by configuring two 12 volt batteries in a series configuration. In a representative embodiment, the solenoid control circuit can comprise of solenoids Sol. 1, Sol. 2 and Sol. 3 operatively coupled together as shown in FIG. 2.

In some embodiments, hydraulic power can be supplied by the DC motor Generator F10 to provide a hydraulic power source for auxiliary vehicle mounted equipment F32, such as a crane or other hydraulic device, using the hydraulic propulsion system by means of a control block/valve F30 diverting the hydraulic flow from the hydraulic PTO F13 and routing the flow to auxiliary vehicle mounted equipment F32. Alternatively, the hydraulic flow can be supplied by second hydraulic pump F25 and driven by the DC motor/Generator F10 using a de-coupling device F23 as described to operate only the secondary hydraulic pump F25 while the vehicle is stationary. In some embodiments, the hydraulic system crane or other devices F32 can also be supplied hydraulic power from the PTO F13 without the use of the DC motor/generator F10 through the use of control block/valve F30 and plumbing as is known.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:
1. An auxiliary power unit system for operating hydraulically-operated equipment, the system configured to be disposed in or on a mobile service vehicle comprising an internal combustion engine operatively coupled to a transmission and at least one alternator operatively coupled to the engine, the transmission comprising a power take-off ("PTO") port, the system comprising:
  a) a first hydraulic pump operatively coupled to the PTO port;
  b) a hydraulic motor/pump operatively coupled to the first hydraulic pump via a control block/valve, the control block/valve configured to operatively couple to the hydraulically-operated equipment;
  c) a direct current ("DC") electric motor/generator operatively coupled to the hydraulic motor/pump via a first clutch; and
  d) at least one battery operatively coupled to the DC electric motor/generator via one or both of a charger control circuit and a motor control circuit, wherein the charger control circuit is operatively coupled to the at least one alternator.

2. The system as set forth in claim 1, wherein the first clutch comprises one of a one-way free-wheeling clutch, an electrically-operated clutch and a centrifugal clutch.

3. The system as set forth in claim 1, further comprising one or both of an air conditioning compressor and a second hydraulic pump operatively coupled to the DC electric motor/generator.

4. The system as set forth in claim 1, wherein the charger control circuit is configured to operatively couple with the at least one alternator.

5. The system as set forth in claim 1, further comprising an alternating current ("AC") inverter operatively coupled to the at least one battery.

6. The system as set forth in claim 1, wherein the at least one battery comprises two batteries.

7. The system as set forth in claim 6, further comprising a voltage boosting circuit operatively coupled to the two batteries, the voltage boosting circuit configured to couple the two batteries in a series configuration.

8. The system as set forth in claim 1, further comprising one or both of an electronic throttle control and an electronic throttle position sensor operatively coupled to the motor control circuit.

9. The system as set forth in claim 1, further comprising one or both of a brake system sensor and an accelerometer operatively coupled to the charger control circuit.

10. The system as set forth in claim 1, further comprising an engine start-stop system configured to charge the at least one battery by starting the engine when a voltage of the at least one battery drops below a first pre-determined voltage, the engine start-stop system further configured to stop the engine when the voltage of the at least one battery rises above a second pre-determined voltage.

11. A method for operating hydraulically-operated equipment with an auxiliary power unit system disposed in or on a mobile service vehicle comprising an internal combustion engine operatively coupled to a transmission and at least one alternator operatively coupled to the engine, the transmission comprising a power take-off ("PTO") port, the method comprising:
   a) receiving the system, wherein the system comprises:
      i) a first hydraulic pump operatively coupled to the PTO port,
      ii) a hydraulic motor/pump operatively coupled to the first hydraulic pump via a control block/valve, the control block/valve configured to operatively couple to the hydraulically-operated equipment,
      iii) a direct current ("DC") electric motor/generator operatively coupled to the hydraulic motor/pump via a clutch, and
      iv) at least one battery operatively coupled to the DC electric motor/generator via one or both of a charger control circuit and a motor control circuit, wherein the charger control circuit is operatively coupled to the at least one alternator;
   b) operatively coupling the hydraulically-operated equipment to the control block/valve; and
   c) operating the DC electric motor/generator with the at least one battery to operate the hydraulic motor/pump as a pump for pumping hydraulic fluid to the hydraulically-operated equipment through the control block/valve.

12. The method as set forth in claim 11, wherein the first clutch comprises one of a one-way free-wheeling clutch, an electrically-operated clutch and a centrifugal clutch.

13. The method as set forth in claim 11, further comprising operating one or both of an air conditioning compressor and a second hydraulic pump with the DC electric motor/generator.

14. The method as set forth in claim 11, wherein the charger control circuit is configured to operatively couple with the at least one alternator.

15. The method as set forth in claim 11, wherein the system further comprises an alternating current ("AC") inverter operatively coupled to the at least one battery.

16. The method as set forth in claim 11, wherein the at least one battery comprises two batteries.

17. The method as set forth in claim 16, further comprising coupling the two batteries in a series configuration with a voltage boosting circuit.

18. The method as set forth in claim 11, wherein the system further comprises one or both of an electronic throttle control and an electronic throttle position sensor operatively coupled to the motor control circuit.

19. The method as set forth in claim 11, wherein the system further comprises one or both of a brake system sensor and an accelerometer operatively coupled to the charger control circuit.

20. The method as set forth in claim 11, wherein the system further comprises one or both of a brake system sensor and an accelerometer operatively coupled to the charger control circuit.

* * * * *